US008667513B1

(12) United States Patent
Shah et al.

(10) Patent No.: US 8,667,513 B1
(45) Date of Patent: Mar. 4, 2014

(54) DORMANCY TIMER ADJUSTMENT IN A WIRELESS ACCESS NODE BASED ON WIRELESS DEVICE APPLICATION STATUS

(75) Inventors: Maulik K. Shah, Overland Park, KS (US); Jason Peter Sigg, Overland Park, KS (US); Ashish Bhan, Shawnee, KS (US); Jasinder Pal Singh, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 349 days.

(21) Appl. No.: 13/074,198

(22) Filed: Mar. 29, 2011

(51) Int. Cl.
*G06F 3/00* (2006.01)
(52) U.S. Cl.
USPC .......................................... 719/328; 719/330
(58) Field of Classification Search
USPC .................................................. 719/328, 330
See application file for complete search history.

(56) References Cited

U.S. PATENT DOCUMENTS

| 5,757,360 | A | 5/1998 | Nitta et al. | |
| 6,363,204 | B1 | 3/2002 | Johnson et al. | |
| 6,459,902 | B1 * | 10/2002 | Li et al. | 455/453 |
| 6,570,606 | B1 | 5/2003 | Sidhu et al. | |
| 6,742,051 | B1 * | 5/2004 | Bakshi et al. | 719/318 |
| 6,782,350 | B1 * | 8/2004 | Burnley et al. | 702/186 |
| 7,135,968 | B2 * | 11/2006 | Hosny | 340/539.32 |
| 7,143,648 | B2 | 12/2006 | Pristup | |
| 7,623,497 | B2 | 11/2009 | O'Neill | |
| 7,996,908 | B2 * | 8/2011 | Barker et al. | 726/26 |
| 8,064,829 | B2 * | 11/2011 | Matsuo et al. | 455/41.2 |
| 2003/0117440 | A1 | 6/2003 | Hellyar et al. | |
| 2004/0098622 | A1 | 5/2004 | O'Neill | |
| 2007/0143493 | A1 | 6/2007 | Mullig et al. | |
| 2007/0173270 | A1 * | 7/2007 | Block et al. | 455/507 |
| 2007/0180401 | A1 | 8/2007 | Singh et al. | |
| 2007/0226519 | A1 * | 9/2007 | Elbring | 713/190 |
| 2008/0225865 | A1 | 9/2008 | Herzog | |
| 2008/0228429 | A1 | 9/2008 | Huang et al. | |
| 2009/0201857 | A1 | 8/2009 | Daudin et al. | |
| 2009/0274102 | A1 | 11/2009 | O'Neill | |
| 2010/0054231 | A1 | 3/2010 | Dolganow et al. | |
| 2013/0104052 | A1 * | 4/2013 | Chang et al. | 715/752 |

FOREIGN PATENT DOCUMENTS

EP 1562350 8/2005

OTHER PUBLICATIONS

Javed. I. Khan, Event Model and Application Programming Interface of TCP-Interactive, Feb. 2, 2013.*
"Method for Reducing Bandwidth of Streaming Audio and Video Applications," IP.com Journal; Mar. 23, 2005; p. 1; IP.com Inc.; West Henrietta, NY, U.S.A.
H. Schulzrinne, et al.; "Real Time Streaming Protocol 2.0 (RTSP);" MMUSIC Working Group; Jul. 13, 2009; pp. 1-282; Obsoletes: RFC 2326; IETF Trust.

* cited by examiner

*Primary Examiner* — Lechi Truong

(57) ABSTRACT

Embodiments disclosed herein provide systems and methods for adjusting a dormancy timer in a wireless access node based on wireless device application status. In a particular embodiment, a method provides monitoring Application Programming Interface (API) calls from applications running on a wireless communication device for user interface functions and monitoring status of user interface components. The method further provides processing the API calls for the user interface functions and the status of the user interface components to set a dormancy timer threshold. The method further provides transferring the dormancy timer threshold to a wireless communication network that releases a wireless link to the wireless communication device if a dormancy timer for the wireless communication device reaches the dormancy timer threshold.

18 Claims, 6 Drawing Sheets

DORMANCY TIMER ADJUSTMENT IN A WIRELESS ACCESS NODE BASED ON WIRELESS DEVICE APPLICATION STATUS

TECHNICAL BACKGROUND

A wireless access node that is used by wireless devices to communicate with a wireless network has a limited amount of bandwidth to allocate among connected wireless devices. This limited bandwidth is allocated by assigning a wireless access link (or channel) to each wireless device that needs to exchange communications. A dormancy timer in the access node tracks the amount of time since a wireless device last exchanged communications so that, when a certain amount of time has passed, the access node can release the access link for that device. Once released, the access link can be assigned to other wireless devices that need to exchange communications with the access node. Allowing the access link to stay allocated to a wireless device for a time after communications have completed enables subsequent communications to be exchanged without the need to reallocate an access link to the wireless device.

Many wireless devices are capable of executing applications that require the use of an access link for wireless communications. Sometimes these applications will run in the background where a user is not actively interacting with the application and sometimes they will run in the foreground where a user is actively interacting with the application. When a user is actively interacting with an application it is more likely that an application will exchange subsequent communications over an access link than would an application running in the background. Thus, the user experience of an application running in the foreground may benefit from not needing to take the time necessary to have a new access link allocated to the wireless device in order to exchange subsequent communications.

Overview

Embodiments disclosed herein provide systems and methods for adjusting a dormancy timer in a wireless access node based on wireless device application status. In a particular embodiment, a method provides monitoring Application Programming Interface (API) calls from applications running on a wireless communication device for user interface functions and monitoring status of user interface components. The method further provides processing the API calls for the user interface functions and the status of the user interface components to set a dormancy timer threshold. The method further provides transferring the dormancy timer threshold to a wireless communication network that releases a wireless link to the wireless communication device if a dormancy timer for the wireless communication device reaches the dormancy timer threshold.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
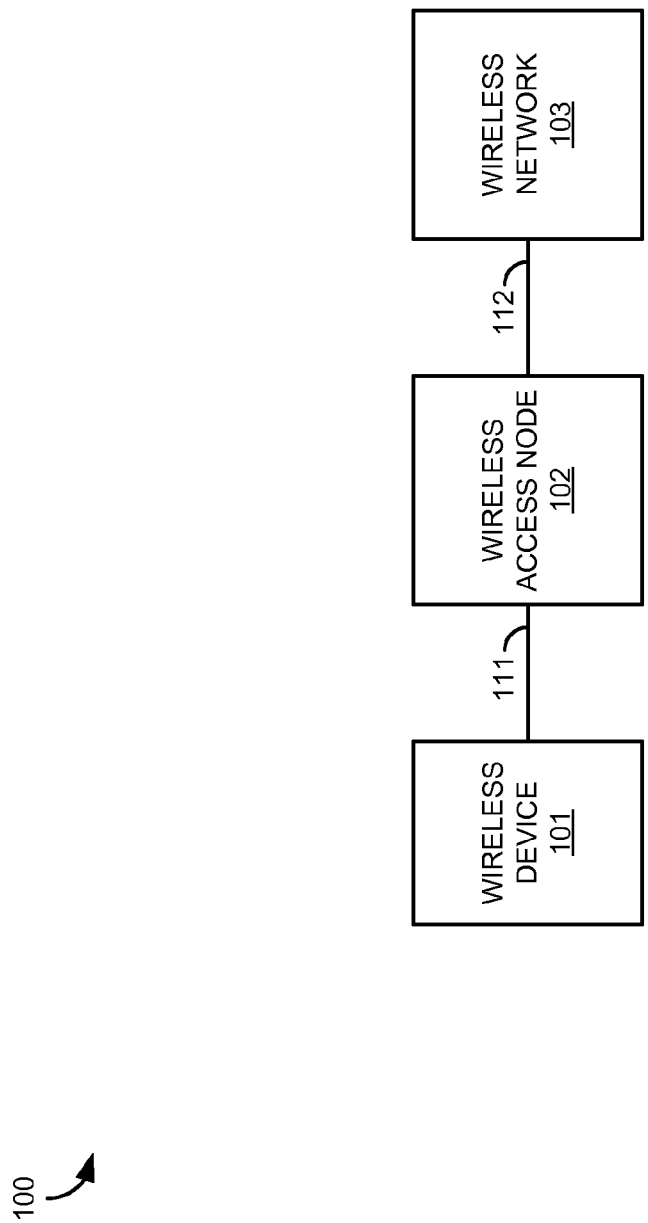
FIG. 1 illustrates a wireless communication system for adjusting a dormancy timer in a wireless access node based on wireless device application status.

FIG. 1 illustrates wireless communication system 100. Wireless communication system 100 includes wireless communication device 101, wireless access node 102, and wireless communication network 103. Wireless communication device 101 and wireless access node 102 communicate over wireless link 111. Wireless access node 102 and wireless communication network 103 communicate over communication link 112.

In operation, access node 102 has a limited amount of radio frequency spectrum bandwidth that can be allocated among connected wireless devices. This limited amount of spectrum is divided among a number of wireless access links. An access link is only assigned to wireless device 101 when wireless device 101 needs an access link to exchange communications with access node 102. During periods of time when wireless device 101 does not need to exchange communications, access node 102 does not assign an access link to wireless device 101 so that the access link can be assigned to other devices that do need to exchange communications with access node 102.

Access node 102 controls the allocation of access links among wireless devices by using a dormancy timer for each access link assigned to a wireless device. In particular, a dormancy timer for wireless device 101 keeps track of the amount of time that has elapsed since wireless device 101 last exchanged communications over an assigned access link. The dormancy timer is typically set to allow enough time for successive communications to be exchanged without wireless device 101 needing to request another access link from access node 102. Once the dormancy timer indicates that the set amount of time has passed since wireless device 101 last exchanged communications, access node 102 releases the access link from wireless device 101 so that the access link can be allocated to other devices that may need to exchange communications with access node 102.

Figure 2:
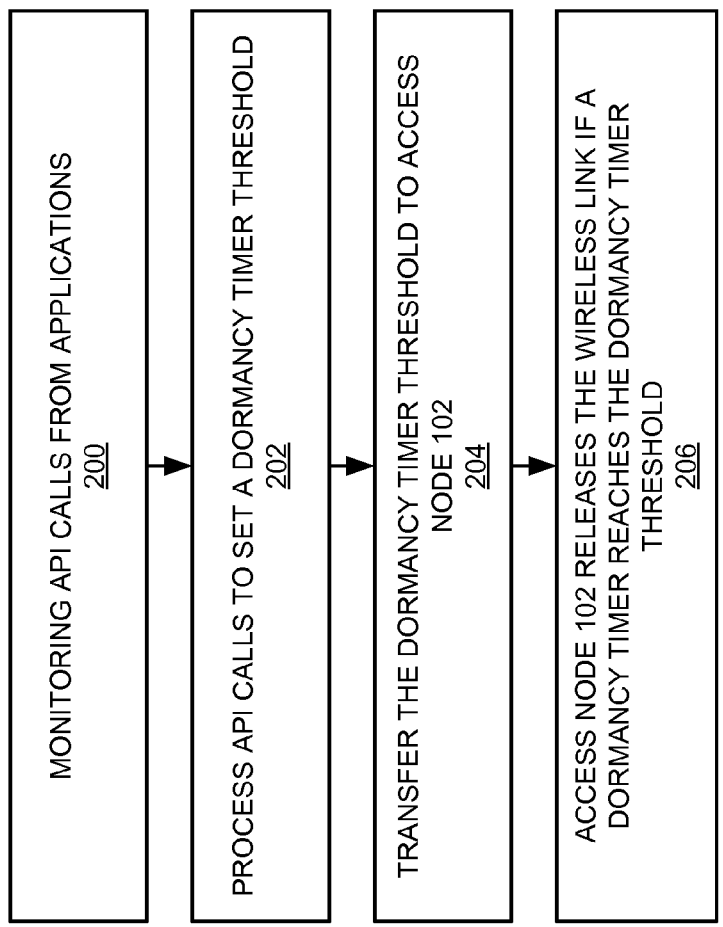
FIG. 2 illustrates the operation of a wireless communication system for adjusting a dormancy timer in a wireless access node based on wireless device application status.

FIG. 2 illustrates the operation of wireless communication system 100 for adjusting a dormancy timer in a wireless access node based on wireless device application status. Wireless device 101 is a wireless device, such as a cellular phone, laptop computer, or any other type of wireless device that is capable of executing applications that require wireless communications with wireless network 103 via access node 102. These applications may include web browsers, messaging, email, social networking, Voice over Internet Protocol, streaming media, or any other type of application capable of executing on a wireless device.

Wireless device 101 begins the operation by monitoring Application Programming Interface (API) calls from the applications for user interface functions and monitoring the status of user interface components (step 200). The applications executing on wireless device 101 make API calls to the operating system of wireless device 101 in order to access the functions of wireless device 101. Moreover, API calls for user interface functions include API calls that access input or output functions of various user interfaces on wireless device 101, such as a display, speaker, keyboard, LED notifier, microphone, or any other type of user input or output interface.

For example, if an application needs to show something on a display of wireless device 101, then the application will call an API for a display function of wireless device 101. Wireless device 101 may include multiple user interfaces of a certain user interface type, such as multiple displays or microphones, with each of these multiple user interfaces having separate APIs. Additionally, there may be multiple APIs for each individual user interface. For example, one API may be called to show a notification on a display while a second API may be called for the display to display an application full screen.

The user interface components may be monitored selectively or wireless device 101 may monitor all user interface components of wireless device 101. For example, wireless device 101 may monitor the status of only the user interface components that are subject to API calls by the applications or wireless device 101 may monitor all user interface components in order to know the current state of all components. The status of the user interface components includes any type of status information, such as display on/off state, display brightness, speaker on/off state, speaker volume, keyboard slide out state (for a slide out keyboard), keypad lock, or any other type of status information for user interface components.

The API calls for the user interface functions and the status of the user interface components are processed to set a dormancy timer threshold (step 202). If there is no API call to a user interface function, then the dormancy timer threshold is set to a lower value. Likewise, if there is an API call to a user interface function but the status of the user interface components that are called by the API is set to off, then the dormancy timer threshold is also set to a lower value. The off state may include a state where the user interface components are not in use. For example, while speakers of wireless device 101 may still be technically on, the volume setting on wireless device 101 may be turned all the way down or muted. In a similar example, a keyboard for wireless device 101 may still be considered to be on but is in a closed position so as it would not or could not be used.

The threshold is set to a lowered value because the application is determined to be running in the background on wireless device 101. This determination is due to the lack of user interface API calls indicates that the user is not interacting with the application. Therefore, a shorter dormancy timer threshold is desirable because the user experience does not suffer as much if a background application needs a wireless link reallocated for subsequent communication exchanges with wireless access node 102. Similarly, it is typically the case that applications running in the background need to exchange communications less frequently than those running in the foreground, thereby, reducing the need for continued allocation of an access link for subsequent communications.

Alternatively, if there is an API call to a user interface function and the user interface component associated the call has a status set to on, then the application is considered to be running in the foreground. Consequently, the dormancy timer threshold is increased to a higher value than would otherwise be set had the application been running in the background. For example, the dormancy timer threshold may be increased to 10 seconds for an application running in the foreground as opposed to 1 second, or possibly even zero seconds, for an application running in the background.

The threshold is set to a higher value because the application is determined to be running in the foreground on wireless device 101. This determination is due to the user interface API calls being directed to a user interface component that has a status of currently being active or on, which indicates that the user is more likely to be interacting with the application. Therefore, a longer dormancy timer threshold is desirable because it is more likely that the application will exchange subsequent communications that require an access link. The user experience is be less likely to suffer if wireless device 101 is able to hold on to the access link assigned to wireless device 101 for a longer period of time so that any subsequent communications do not need to request a new access link from access node 102.

In some embodiments, wireless device 101 may not determine whether the user interface component that is called by the API is active. In those embodiments, an application is considered to be running in the foreground in the event of an API call to a user interface function without the need to determine the status of the user interface component that is called.

In some embodiments, both foreground and background applications may be executing on wireless device 101. In those embodiments, the increased dormancy timer threshold set for any foreground applications overcomes the shorter dormancy timer threshold that would otherwise be set for any background applications.

After wireless device 101 has determined the dormancy timer threshold, wireless device 101 transfers the dormancy timer threshold to access node 102 on wireless network 103 (step 204). The dormancy timer threshold may be transmitted to access node 102 in a message over the access link or over a control channel for control communications between wireless device 101 and access node 102. Furthermore, a probe used by wireless device 101 to determine whether an access link is currently active for wireless device 101 may contain the message indicating the dormancy timer threshold.

Access node 102 in turn releases a wireless access link assigned to wireless device 101 if a dormancy timer for wireless device 101 reaches the dormancy timer threshold (step 206). If the dormancy timer counts up the amount of time elapsed since the last communications were exchanged between access node 102 and wireless device 101, then access node 102 will release the access link for wireless device 101 when the dormancy timer counts up to the dormancy timer threshold. Hence, if the dormancy timer threshold is 10 seconds then the dormancy timer will count from 0 up to 10 seconds before releasing the access link. Alternatively, the dormancy timer may count down from the last time communications were exchanged between access node 102 and wireless device 101. In that case, the dormancy timer threshold may indicate the value from which the dormancy timer counts. Thus, if the timer is set for 10 seconds, then the dormancy timer will start at 10 seconds after the last communications were exchanged and count down to zero before releasing the access channel.

In both dormancy timer examples from above, if subsequent communications are exchanged on the access link before the dormancy timer reaches the dormancy timer threshold, then the dormancy timer may be reset. The dormancy timer threshold may be a different value than it was set to previously depending on whether the application that exchanged those subsequent communications was running in the background or in the foreground. If the subsequent communications were for a background application, then the dormancy timer should be reset only if the dormancy timer threshold would allow a greater amount of time before access link release than what the dormancy timer is currently indicating. This prevents a longer dormancy timer for a running foreground application from being negated by a shorter dormancy timer due to the subsequent communications exchanged by a background application. It follows, therefore, that subsequent communications from a foreground application will always reset the dormancy timer because the dormancy timer threshold is longest for foreground applications.

In view of the above examples, it follows that while an application may be considered to be running in the foreground or background based on traditional conceptions, wireless device 101 may not make the same determination based on the method set forth herein. For example, a music streaming application may continue to stream music from a server and play that music out of a speaker of wireless device 101 while a user interacts with other applications on wireless device 101. Traditionally, the music streaming application may be considered to be running in the background. However, consistent with the method above, the music streaming application is considered to be running in the foreground for purposes of a dormancy timer threshold because the application is calling an API for a speaker user interface.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Wireless access node 102 comprises RF communication circuitry and an antenna. The RF communication circuitry typically includes an amplifier, filter, RF modulator, and signal processing circuitry. Wireless access node 102 may also comprise a router, server, memory device, software, processing circuitry, cabling, power supply, network communication interface, structural support, or some other communication apparatus. Wireless access node 102 could be a base station, Internet access node, telephony service node, wireless data access point, or some other wireless communication system—including combinations thereof.

Wireless communication network 103 comprises network elements that provide wireless devices with wireless communication access to packet communication services. Wireless network 103 may comprise switches, wireless access nodes, Internet routers, network gateways, application servers, computer systems, communication links, or some other type of communication equipment—including combinations thereof.

Wireless link 111 uses the air or space as the transport media. Wireless link 111 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication link 112 uses metal, glass, air, space, or some other material as the transport media. Communication link 112 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 112 could be a direct link or may include intermediate networks, systems, or devices.

Figure 3:
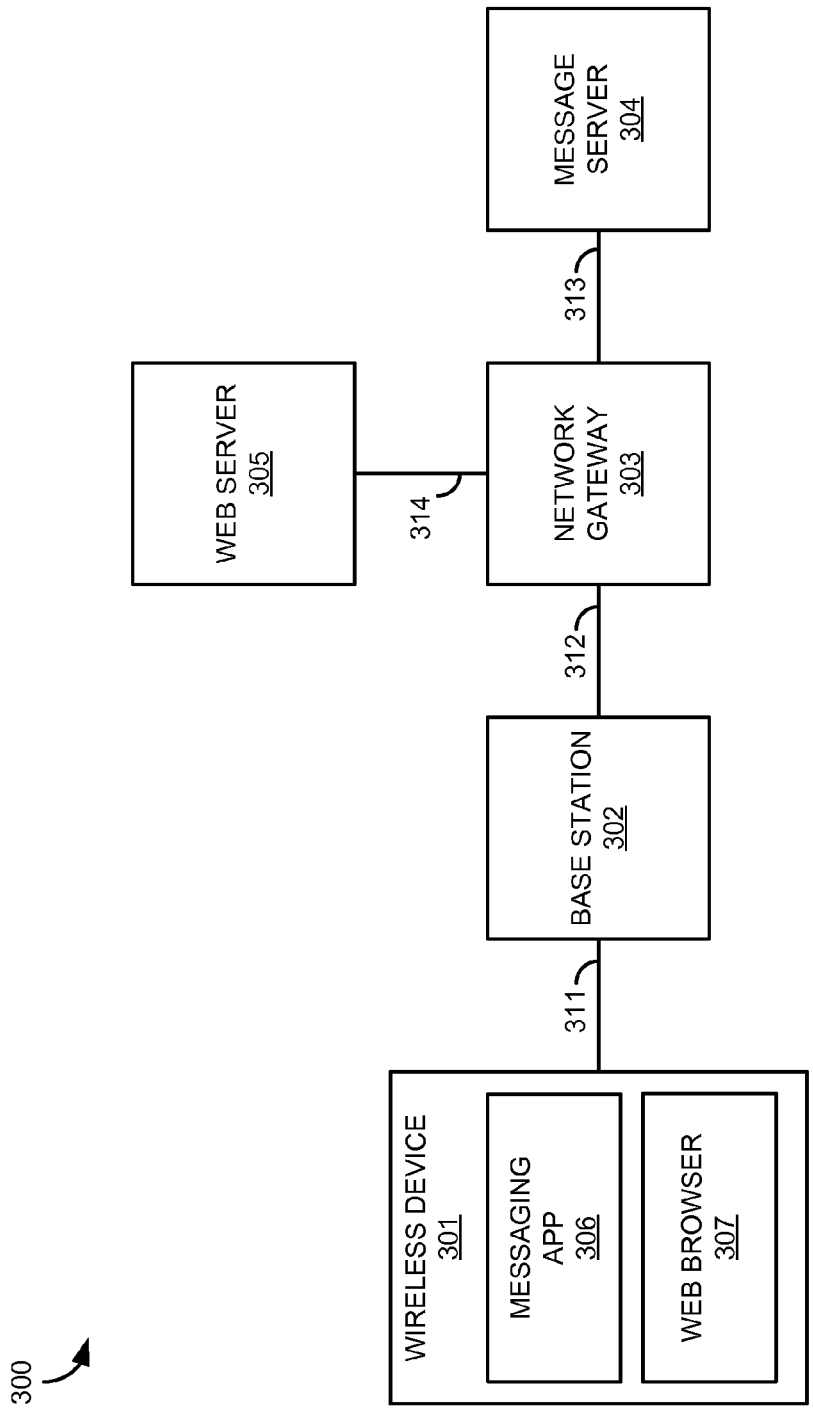
FIG. 3 illustrates a wireless communication system for adjusting a dormancy timer in a wireless access node based on wireless device application status.

FIG. 3 illustrates wireless communication system 300. Wireless communication system 300 includes wireless communication device 301, wireless base station 302, network gateway 303, message server 304, and web server 305. Messaging application 306 and web browser application 307 are executing on wireless device 301. Wireless communication device 301 and base station 302 communicate over wireless link 311. Base station 302 and network gateway 303 communicate over communication link 312. Network gateway 303 and message server 304 communicate over communication link 313. Network gateway 303 and web server 305 communication over communication link 314.

Figure 4:
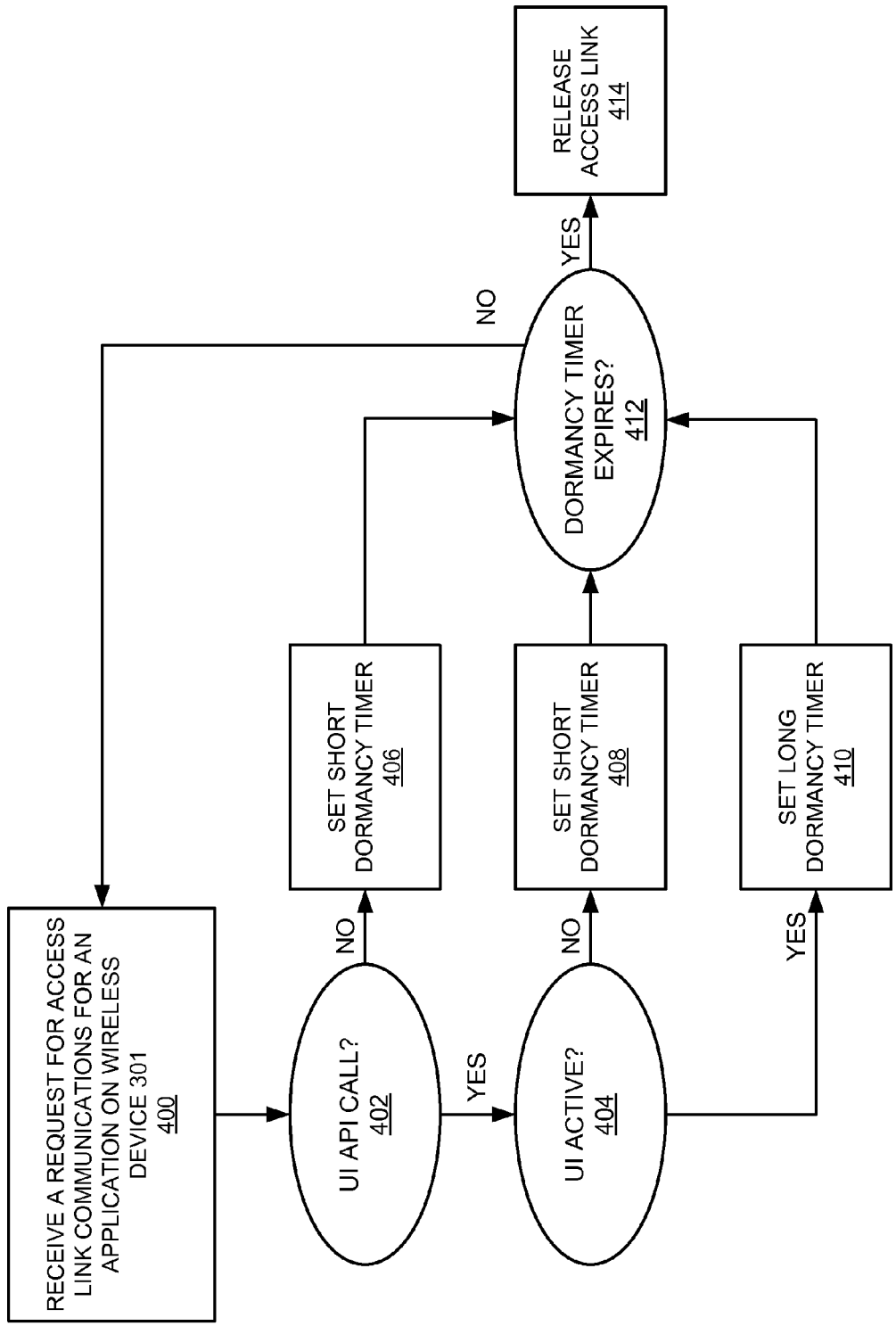
FIG. 4 illustrates the operation of a wireless communication system for adjusting a dormancy timer in a wireless access node based on wireless device application status.

FIG. 4 illustrates the operation of wireless communication system 300 for adjusting a dormancy timer in base station 302 based on wireless device 301 application status. In operation, wireless device 301 executes messaging application 306 and web browsing application 307. Messaging application 306 may exchange any type of messages, such as SMS, MMS, email, Instant Messaging, or some other type of message through messaging server 304. Messaging server 304 may be located on the Internet, a wireless network that base station 302 is a part of, or any other network or computer system capable of communicating with network gateway 303. Web browser 307 receives websites for displaying to a user of wireless device 301 via web server 305, which may be located on the Internet.

Wireless device 301 continually monitors API calls for user interface functions made by messaging application 306, web browser 307, and any other applications executing on wireless device 301. The API calls for the user interface functions are related to user interface components of wireless device 301. For example, a music player application may use an API call to the speaker to play music, an API call to the display to show what song is playing, and an API call to a keyboard or touch screen so that a user can indicate a desired song to play. Likewise, web browser 307 may make an API call to a display to display a web page and an API call to a keyboard or touch screen to receive a web address.

Figure 5:
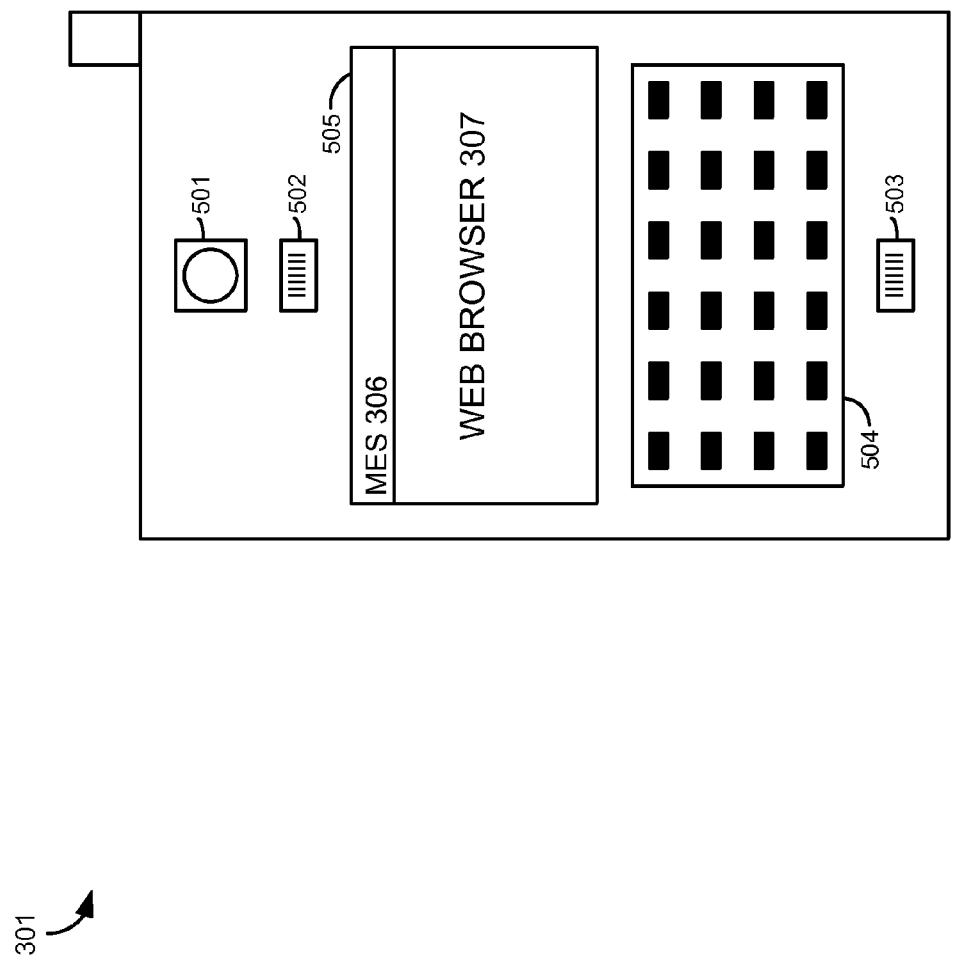
FIG. 5 illustrates a wireless communication device for adjusting a dormancy timer in a wireless access node based on wireless device application status.

FIG. 5 illustrates wireless device 301 with user interface components to which the user interface API calls may be directed. In this example, wireless device 301 includes camera 501, speaker 502, microphone 503, keyboard 504, and display 505. Wireless device 301 may omit one or more of these components or include further components, such as a second speaker, second camera, notifier LED, or any other type of user interface component.

Referring back to FIG. 4, web browser 307 requests access link communications so that web browser 307 can retrieve a web page from web server 305 to display to a user on display 505. Wireless device 301 recognizes that web browser 307 is requesting access link communications on the access link with base station 302 (step 400). Wireless device 301 then determines whether web browser 307 made an API call to any of user interfaces 501-505 (step 402). This determination may be made by determining whether any user interface API calls were performed within a certain time period before or after the request for access link communications, for example an API call occurring within one second of the access link communication request.

In this example, web browser had made an API call to present an application interface for web browser 307 on display 505 before the access request. Therefore, the process moves to step 404 where wireless device 101 determines whether display 505 is active to carry out the API call request. If display 505 is not active, then web browser 307 is determined to be running in the background. Since web browser 307 is running in the background, wireless device 301 sets a bit in a probe that determines whether there is an access link (or requests an access link if there is none) that indicates that the dormancy timer for the access link should be set for a short period of time, such as one second (step 408). In contrast, if display 305 is active at step 404, then web browser 307 is determined to be running in the foreground. Hence, wireless device 301 sets a bit in the probe that indicates that the dormancy timer for the access link should be set for a longer period of time, such as ten seconds (step 410).

In another example, returning to step 400, messaging application 306 requests access link communications so that messaging application 306 can retrieve messages from messaging server 304. Wireless device 301 recognizes that messaging application 306 is requesting access link communications on the access link with base station 302 (step 400). Wireless device 301 then determines whether messaging application 306 made an API call to any of user interfaces 501-505 (step 402). This determination, as before with web browser 307, may be made by determining whether any user interface API calls were performed within a certain time period before or after the request for access link communications, for example an API call occurring within one second of the access link communication request.

In this example, messaging application called an API for displaying a notification in the upper left hand corner of display 505 and also called an API for playing a notification sound through speaker 502. However, in step 402, wireless device 301 determines that the API calls for notifications of this type are not API calls that would indicate that an application is running in the foreground. Therefore, wireless device 301 determines that messaging application 306 is running in the background and sets a bit in the probe that indicates that the dormancy timer for the access link should be set for a short period of time (step 406).

In both examples from above, after the most recent communication exchange between wireless device 301 and base station 302 on the access link, base station 302 starts a dormancy timer in accordance with the bit from the probe transferred from wireless device 301. Unless subsequent communications are exchanged on the access link that reset the dormancy timer, the dormancy timer will expire (step 412). Once the dormancy timer expires, base station 302 releases the access link assigned to wireless device 301 so that the access link can be assigned to other wireless devices (step 414).

Figure 6:
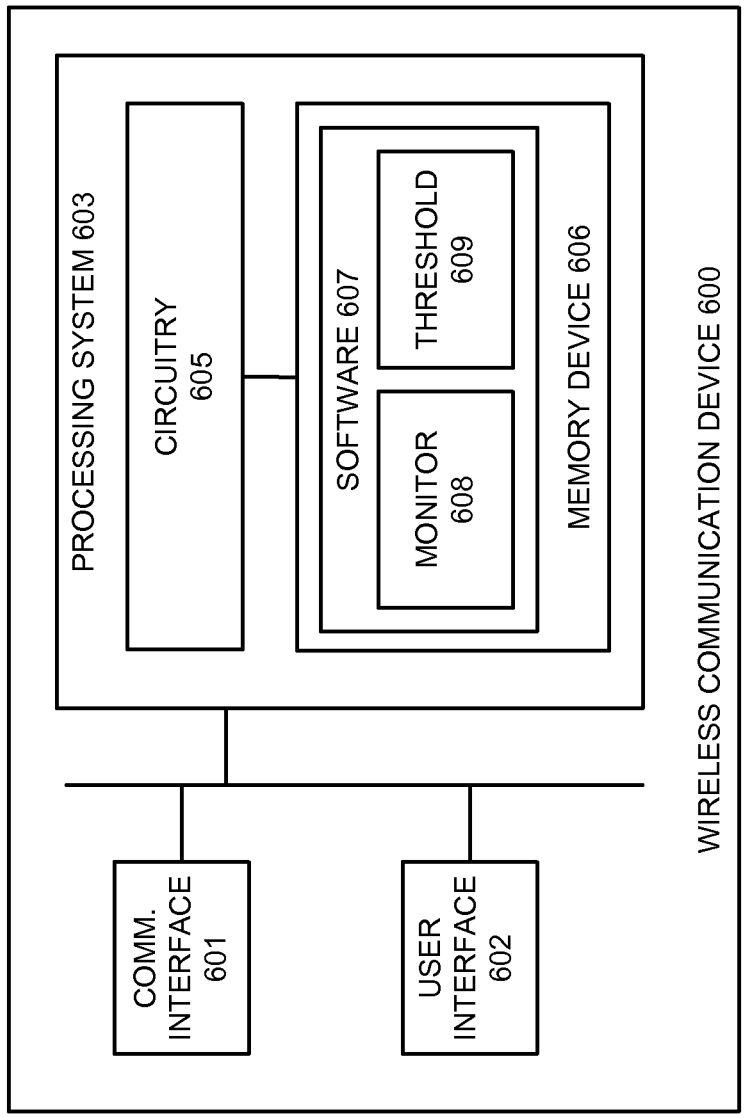
FIG. 6 illustrates a wireless communication device for adjusting a dormancy timer in a wireless access node based on wireless device application status.

FIG. 6 illustrates wireless communication device 600. Wireless communication device 600 is an example of wireless communication devices 101 and 301, although devices 101 and 301 could use alternative configurations. Wireless communication device 600 comprises wireless communication interface 601, user interface 602, and processing system 603. Processing system 603 is linked to wireless communication interface 601 and user interface 602. Processing system 603 includes processing circuitry 605 and memory device 606 that stores operating software 607. Wireless communication device 601 may include other well-known components such as a battery and enclosure that are not shown for clarity. Wireless communication device 600 may be a telephone, computer, e-book, mobile Internet appliance, media player, game console, wireless network interface card, or some other wireless communication apparatus—including combinations thereof.

Wireless communication interface 601 comprises RF communication circuitry and an antenna. The RF communication circuitry typically includes an amplifier, filter, RF modulator, and signal processing circuitry. Wireless communication interface 601 may also include a memory device, software, processing circuitry, or some other communication device. Wireless communication interface 601 may use various protocols, such as CDMA, EVDO, WIMAX, GSM, LTE, WIFI, HSPA, or some other wireless communication format.

Wireless communication interface is configured to transfer a dormancy timer threshold to a wireless communication network that releases a wireless link to wireless communication device 600 if a dormancy timer for wireless communication device 600 reaches the dormancy timer threshold.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. User interface 602 may omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus. Processing circuitry 605 is typically mounted on a circuit board that may also hold memory device 606 and portions of communication interface 601 and user interface 602. Operating software 607 comprises computer programs, firmware, or some other form of machine-readable processing instructions. Operating software 607 includes monitor module 608 and dormancy timer threshold module 609. Operating software 607 may further include an operating system, utilities, drivers, network interfaces, applications, or some other type of software. When executed by processing circuitry 605, operating software 607 directs processing system 603 to operate wireless communication device 600 as described herein.

In particular, monitor module 608 of operating software 607 directs processing system 603 to monitor API calls from applications executing on processing system 603 for user interface functions and monitor status of user interface components of user interface 602. Dormancy timer threshold module 609 then directs processing system 603 to process the API calls for the user interface functions and the status of the user interface components to set a dormancy timer threshold.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device that executes applications that require wireless communications, the method comprising:

monitoring Application Programming Interface (API) calls from the applications for user interface functions and monitoring status of user interface components;

processing the API calls for the user interface functions and the status of the user interface components to set a dormancy timer threshold, wherein processing the API calls for the user interface functions and the status of the user interface components to set the dormancy timer threshold comprises lowering the dormancy timer threshold if the applications do not make the API calls for the user interface functions;

transferring the dormancy timer threshold to a wireless communication network that releases a wireless link to the wireless communication device if a dormancy timer for the wireless communication device reaches the dormancy timer threshold.

2. The method of claim 1 wherein processing the API calls for the user interface functions and the status of the user interface components to set the dormancy timer threshold comprises lowering the dormancy timer threshold if the status is off for the user interface components that are associated with the API calls for the user interface functions.

3. The method of claim 1 wherein processing the API calls for the user interface functions and the status of the user interface components to set the dormancy timer threshold comprises increasing the dormancy timer threshold if one of the applications has makes one of the API calls for the user interface functions.

4. The method of claim 1 wherein processing the API calls for the user interface functions and the status of the user interface components to set the dormancy timer threshold comprises increasing the dormancy timer threshold if one of the applications has makes one of the API calls for the user interface functions and if the status is on for the one of the user interface components that is associated with the one API call.

5. The method of claim 1 wherein processing the API calls for the user interface functions and the status of the user interface components to set the dormancy timer threshold comprises setting the dormancy timer threshold to zero.

6. The method of claim 1 wherein the wireless communication network initiates the dormancy timer after the wireless communications with the wireless communication device terminate.

7. The method of claim 1 wherein the user interface functions comprise playing audio and displaying graphics.

8. The method of claim 1 wherein the user interface components comprise a speaker and a graphic display.

9. The method of claim 1 wherein the applications comprise a messaging application and an internet browsing application.

10. A wireless communication device that executes applications that require wireless communications, comprising:

a processing circuitry configured to monitor Application Programming Interface (API) calls from the applications for user interface functions and monitoring status of user interface components and process the API calls for the user interface functions and the status of the user interface components to set a dormancy timer threshold, wherein the processing system is configured to process the API calls for the user interface functions and the status of the user interface components to set the dormancy timer threshold by lowering the dormancy timer threshold if the applications do not make the API calls for the user interface functions;

a communication interface configured to transfer the dormancy timer threshold to a wireless communication network that releases a wireless link to the wireless communication device if a dormancy timer for the wireless communication device reaches the dormancy timer threshold.

11. The wireless communication device of claim 10 wherein the processing system is configured to process the API calls for the user interface functions and the status of the user interface components to set the dormancy timer threshold by lowering the dormancy timer threshold if the status is off for the user interface components that are associated with the API calls for the user interface functions.

12. The wireless communication device of claim 10 wherein the processing system is configured to process the API calls for the user interface functions and the status of the user interface components to set the dormancy timer threshold by increasing the dormancy timer threshold if one of the applications makes one of the API calls for the user interface functions.

13. The wireless communication device of claim 10 wherein the processing system is configured to process the API calls for the user interface functions and the status of the user interface components to set the dormancy timer threshold by increasing the dormancy timer threshold if one of the applications makes one of the API calls for the user interface functions and if the status is on for the one of the user interface components that is associated with the one API call.

14. The wireless communication device of claim 10 wherein the processing system is configured to process the API calls for the user interface functions and the status of the user interface components to set the dormancy timer threshold by setting the dormancy timer threshold to zero.

15. The wireless communication device of claim 10 wherein the wireless communication network initiates the dormancy timer after the wireless communications with the wireless communication device terminate.

16. The wireless communication device of claim 10 wherein the user interface functions comprise playing audio and displaying graphics.

17. The wireless communication device of claim 10 wherein the user interface components comprise a speaker and a graphic display.

18. The wireless communication device of claim 10 wherein the applications comprise a messaging application and an internet browsing application.

* * * * *